United States Patent [19]
Bianchi

[11] 3,817,360
[45] June 18, 1974

[54] CAM OPERATED DEVICE FOR CONNECTING BALANCE WHEEL AND MAIN SHAFT IN SEWING MACHINES

[75] Inventor: Nereo Bianchi, Pavia, Italy
[73] Assignee: Necchi Societa per Azioni, Pavia, Italy
[22] Filed: Dec. 11, 1972
[21] Appl. No.: 313,795

[30] Foreign Application Priority Data
Jan. 26, 1972 Italy .................................. 42901/72

[52] U.S. Cl. .................. 192/78, 64/29, 112/218 A, 192/93 R, 192/95, 74/552
[51] Int. Cl. ...................... F16d 11/06, F16d 23/12
[58] Field of Search .......... 192/78, 93 R, 95; 64/29; 188/337, 338, 339

[56] References Cited
UNITED STATES PATENTS

| | | | |
|---|---|---|---|
| 597,479 | 1/1898 | Canfield | 192/78 |
| 832,524 | 10/1906 | Andrews | 192/78 |
| 2,863,410 | 12/1958 | Lange et al. | 192/95 X |
| 2,901,070 | 8/1959 | Hansen | 192/93 R X |
| 2,907,432 | 10/1959 | Strickland et al. | 192/95 X |

Primary Examiner—Samuel Scott
Assistant Examiner—Lance W. Chandler
Attorney, Agent, or Firm—Stevens, Davis, Miller & Mosher

[57] ABSTRACT

A device for connecting the balance wheel of a sewing machine with the main shaft in which a metallic disc within a cylindrical-surface of the balance wheel is rigidly connected with the main shaft, a U-shaped flexible element connected in its lower part with said disc, a U-shaped spring within the flexible element and secured thereto by two tongues engaging two slots on the upper end of the arms of the flexible element and an elliptically shaped cam inside the flexible element and spring so that in one position the cam forces the arms against the cylindrical surface of the balance wheel thereby engaging the main shaft with the balance wheel and in the other position the arms are spaced from the cylindrical surface of the balance wheel as a result of the action of the spring so that the main shaft is disengaged from the balance wheel. The positions of the cam are delimited by the opposite ends of a circumferential groove on the disc and engaged by a tooth provided on the front part of the cam.

1 Claim, 3 Drawing Figures

CAM OPERATED DEVICE FOR CONNECTING BALANCE WHEEL AND MAIN SHAFT IN SEWING MACHINES

The present invention relates to a device for connecting the balance wheel with the main shaft in sewing machines.

It is customary in family type sewing machines to activate a device serving the purpose of connecting and disconnecting at will the main shaft with the balance wheel, which in turn is connected with the machine motor.

With such a device it is possible to utilize the rotation of the balance wheel to run the device for winding up the bobbin without operating the elements directly involved in sewing, such as the needle bar, the hook and the feed unit.

Two systems for connecting the balance wheel with the main shaft are known in the art.

The more common of the two systems consists of two metallic friction discs, one integral with the main shaft and the other integral with the balance wheel, which discs upon being pressed against each other by the operator are constrained to accept an axial load.

The second system is characterized by the use, as a connecting element, of a helical friction spring, a preferred embodiment of which is illustrated in our U.S. Pat. No. 3,460,772.

Devices of this type are trouble prone and rather complex mechanically in some cases.

In friction disc systems, the axial force for tightening the discs is exerted by the operator by means of a control element having a threaded shank screwed onto a threaded recess in a bushing integral with the main shaft. The movement for connecting and disconnecting the balance wheel with the main shaft requires, sometimes, a remarkable effort since, for constructive reasons, very often the diameter of the head of the connecting screw is kept within narrow limits, so that the tightening action exerted by the operator is not strong enough.

Moreover, since in some cases the balance wheel must have a limited circumference, the necessity of having a control element, with a small diameter but strong enough to make it possible to exert a sufficient tightening force with it, is felt even more. The friction spring systems, on the other hand, are easy enough to use and remarkably safe, but are structurally complex.

An object of the present invention is to provide a balance wheel main shaft connecting device which will work safely, which is remarkably simple structurally and which is suitable to eliminate the disadvantages of the known systems.

In order to attain said object it was necessary to develop a new connecting means guaranteeing a safe union between the elements to be connected, although requiring a slight effort in this move, while being, at the same time, of a remarkably simple construction.

The object is attained by a device which comprises a metallic disc rigidly connected with the main shaft, a flexible U-shaped element connected in the lower part with said disc, and an elliptically shaped cam placed inside said element, capable of assuming two working positions, in the first of which it pushes the arms of the U-shaped element against a cylindrical surface of said balance wheel freely rotatable on said main shaft, whereas in the second position it permits said arms to separate from said cylindrical surface, and to return to their rest position by their own elasticity and the combined action of a return spring.

In order that the present invention can be more fully understood and appreciated reference is made without limitation to the drawings attached hereto, in which.

Figure 1:
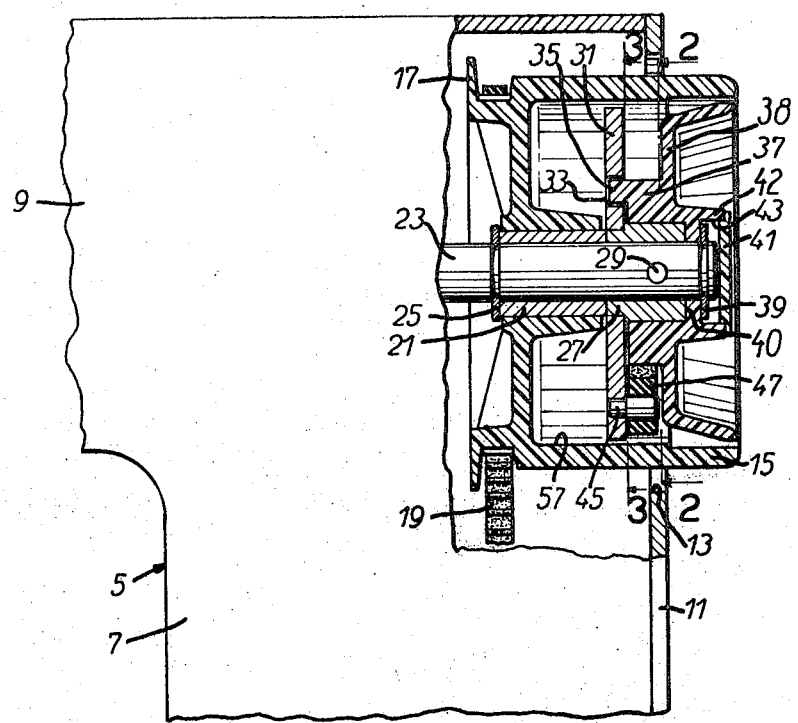
FIG. 1 shows a sectional view of the whole device.

In FIG. 1 is shown a partial view of a sewing machine 5 having a standard 7 and an arm 9. Standard 7 is closed laterally by a cover 11 having a hole 13 from which protrudes a balance wheel 15 on the internal end of which, facing the standard 7, there is a pulley 17 on which is wound a toothed belt 19 operated by an electrical motor not shown in the drawings. Balance wheel 15 is secured on a bushing 21 freely rotatable on main shaft 23, which shaft is supported in a known way in the arm 9.

A ring 25 and a second bushing 27, secured to shaft 23 by means of a pin 29, prevent axial displacement of bushing 21 along shaft 23.

Figure 2:
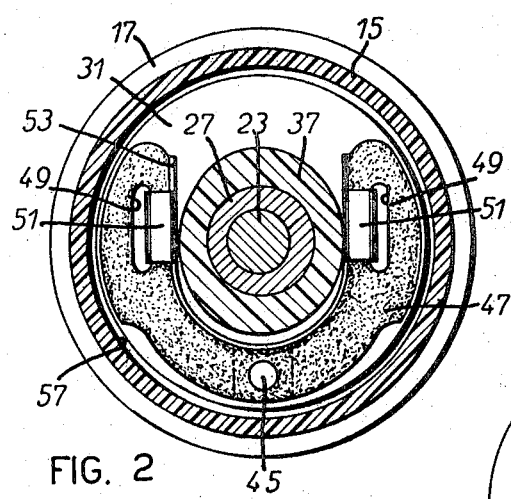
FIG. 2 shows the view of the device of FIG. 1 cutaway according to line 2—2.

To bushing 27 is secured a disc 31 having a circumferential groove 33 (FIG. 3), in which can slide a tooth 35 of a cam 37 having a substantially elliptical shape (FIGS. 1 and 2). Cam 37 is free to rotate on bushing 27, but can not move axially owing to ring 39, located on the end part of shaft 23, and to the front surface 40 of bushing 27. Contrast elements 39 and 40 act on corresponding surfaces on a body 38 serving as a support of cam 37 and closing at the same time the balance wheel 15 laterally.

Plug 41 closes hole 43 on body 38 of cam 37, in which there is the end of shaft 23 with shoulder ring 39.

Body 38 ends in a cylindrical crown 42 serving as a handle, for the operator, for moving the cam 37.

A U-shaped element 47 partly surrounding the cam 37 and included, in its turn, in the internal cylindrical surface 57 of the balance wheel 15, is rigidly connected with disc 31 by means of a connecting pin 45.

Element 47 is preferably made of elastic material with a suitable flexibility and a high coefficient of friction.

A leaf spring 53, U-shaped too, is placed inside element 47 and has at its upper ends two tongues 51 engaging two slots 49 on the arm ends of element 47. The shape of spring 53 is such as to keep the terminal part of element 47 permanently detached from surface 57 of the balance wheel.

The connection and disconnection of the balance wheel, operated by the electrical motor, with and from the main shaft 23 of the sewing machine take place in the way illustrated hereinafter.

Figure 3:
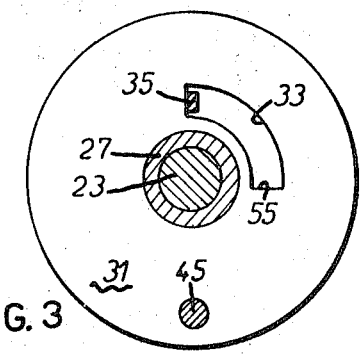
FIG. 3 shows the view of the device of FIG. 1 cutaway according to line 3—3.

In FIGS. 2 and 3, the device of the present invention is shown in its disconnected condition. Cam 37 presses against the tongues 51 of spring 53 with its parts corresponding to the ends of the smaller axis.

In this arrangement, element 47 is detached from the internal surface 57 of balance wheel 15. Balance wheel 15 turns without moving the main shaft 23 and, of course, the sewing organs of the machine connected with it.

In this condition, the balance wheel will operate, in a known way, the bobbin winding device of the lower thread.

As soon as the bobbin is wound, up, the operator, in order to restart sewing, must move the terminal part of body 38 of cam 37 and turn the latter by 90° until its tooth 35 reaches catch wall 55 of groove 33.

Cam 37 now pushes, with the surface corresponding to its bigger axis, the arm ends of element 47 against surface 57 of the balance wheel, against the action of return spring 53. The mechanical connection of the balance wheel with the main shaft through element 47, connecting pin 45, disc 31 and bushing 27 is established in a simple way while the safety of said connection against a possible attrition between the main shaft and the balance wheel can be obtained through a very light pressure between element 47 and surface 57 on account of the long arm of the driving torque involved.

When the operator wants to fill the bobbin with thread, the terminal part of cam 37 must be turned by 90° in the opposite direction until reaching the position shown in FIG. 2. By means of its tongues 51, return spring 53 will bring the arm ends of element 47 away from the internal cylindrical surface 57 of balance wheel 15, thus disconnecting balance wheel 15 from the main shaft 23.

What is claimed is:

1. A device for connecting the balance wheel with the main shaft in sewing machines, comprising a metallic disc within the balance wheel rigidly connected with the main shaft, a U-shaped flexible element, connected in its lower part with said disc, and an elliptically shaped cam placed inside said element and capable of assuming a position in which the "U" shaped element are forced against a cylindrical surface of said balance wheel freely rotatable on said main shaft, and another position in which the two arms of the U-shaped element separate from the cylindrical surface of the balance wheel, and return to their positions of rest by their own elasticity combined with the action of a return spring, said cam being free to rotate but not to move axially with respect to the shaft, the two positions of the cam being delimited by the opposite ends of a circumferential groove on said disc and engaged by a tooth provided on the front part of said cam.

* * * * *